United States Patent
Olson

(10) Patent No.: US 9,772,215 B2
(45) Date of Patent: Sep. 26, 2017

(54) LEVEL MEASUREMENT SYSTEM

(71) Applicant: Michael A. Olson, Ann Arbor, MI (US)

(72) Inventor: Michael A. Olson, Ann Arbor, MI (US)

( * ) Notice: Subject to any disclaimer, the term of this patent is extended or adjusted under 35 U.S.C. 154(b) by 177 days.

(21) Appl. No.: 14/824,033

(22) Filed: Aug. 11, 2015

(65) Prior Publication Data

US 2015/0377687 A1     Dec. 31, 2015

Related U.S. Application Data

(63) Continuation-in-part of application No. 13/964,098, filed on Aug. 11, 2013, now abandoned.

(60) Provisional application No. 61/742,414, filed on Aug. 11, 2012.

(51) Int. Cl.
    *G01F 23/60*        (2006.01)
    *G01M 3/00*        (2006.01)
    *G01F 23/62*        (2006.01)

(52) U.S. Cl.
    CPC .............. *G01F 23/60* (2013.01); *G01F 23/62* (2013.01); *G01M 3/00* (2013.01)

(58) Field of Classification Search
    CPC .. G01D 5/2013; G01D 5/2046; G01D 5/2291; G01F 23/30; G01F 23/60; G01F 23/68; G01F 25/0069
    See application file for complete search history.

(56) References Cited

U.S. PATENT DOCUMENTS

| | | | | |
|---|---|---|---|---|
| 2,645,125 A | * | 7/1953 | Miller | G01F 23/14 |
| | | | | 73/290 R |
| 2,706,410 A | * | 4/1955 | Plath | G01F 23/00 |
| | | | | 73/290 R |
| 3,343,416 A | * | 9/1967 | Chiang | G01F 23/60 |
| | | | | 333/138 |
| 3,538,745 A | * | 11/1970 | Ginsburgh | G01M 3/3245 |
| | | | | 340/623 |
| 3,564,397 A | * | 2/1971 | Sargent et al. | 324/660 |

(Continued)

FOREIGN PATENT DOCUMENTS

| CN | 201747701 U | * | 2/2011 | |
|---|---|---|---|---|
| GB | 2239095 A | * | 6/1991 | ........... G01D 5/2013 |
| KR | 10-1302575 B1 | * | 8/2013 | |

OTHER PUBLICATIONS

English language translation of KR 10-1302575 B1, which originally published on Sep. 2013.*

(Continued)

*Primary Examiner* — David A Rogers
(74) *Attorney, Agent, or Firm* — Jelic Patent Services, LLC; Stanley E. Jelic

(57) ABSTRACT

A level measurement system configured to measure minute changes in fluid level. The system integrates a linear variable differential transformer (LVDT) to provide highly accurate level measurement. Low friction materials and a timed vibrator are used to minimize fluid static friction effects on level measurement. A second LVDT can be utilized to compare the level of a fluid containment structure with level changes caused by environmental factors such as evaporation, tidal effects, wind, or the like. The system also includes a computing device to record and compare level changes over time. A housing connects the elements of the system.

17 Claims, 12 Drawing Sheets

(56) References Cited

U.S. PATENT DOCUMENTS

| | | | | | |
|---|---|---|---|---|---|
| 3,566,221 | A * | 2/1971 | Sargent | | G01D 5/2412 |
| | | | | | 324/660 |
| 3,710,613 | A * | 1/1973 | Innes | | F22B 37/425 |
| | | | | | 335/205 |
| 4,157,036 | A * | 6/1979 | Kivenson | | G01F 23/226 |
| | | | | | 73/290 R |
| 4,543,732 | A * | 10/1985 | Maples | | G01B 7/001 |
| | | | | | 324/207.18 |
| 4,841,844 | A * | 6/1989 | Tootle | | B64C 13/00 |
| | | | | | 464/36 |
| 5,107,699 | A * | 4/1992 | Mastandrea | | G01M 3/3245 |
| | | | | | 73/302 |
| 5,381,854 | A * | 1/1995 | Thomson | | B22D 11/18 |
| | | | | | 164/155.3 |
| 5,415,033 | A * | 5/1995 | Maresca, Jr. | | G01M 3/2892 |
| | | | | | 73/40.5 R |
| 5,686,658 | A * | 11/1997 | Boren | | G01M 3/3245 |
| | | | | | 73/314 |
| 6,018,247 | A * | 1/2000 | Kelly | | G01D 5/202 |
| | | | | | 324/643 |
| 6,474,158 | B2 * | 11/2002 | Czarnek | | G01D 5/2046 |
| | | | | | 73/305 |
| 6,915,692 | B2 * | 7/2005 | Ricco | | F02M 37/103 |
| | | | | | 73/313 |
| 7,082,827 | B1 * | 8/2006 | Samuelson | | G01F 23/0023 |
| | | | | | 73/308 |
| 7,284,422 | B1 * | 10/2007 | Thompson | | G01C 13/004 |
| | | | | | 73/170.29 |
| 7,315,250 | B1 * | 1/2008 | Hernandez-Zelaya | . | G01F 19/00 |
| | | | | | 200/61.2 |
| 7,959,732 | B1 * | 6/2011 | Buzniak | | C30B 11/006 |
| | | | | | 117/14 |
| 9,354,103 | B2 * | 5/2016 | Uskert | | G01F 23/72 |
| 2002/0170354 | A1 * | 11/2002 | Monsrud | | G01N 9/36 |
| | | | | | 73/305 |
| 2005/0056090 | A1 * | 3/2005 | McSheffrey, Jr. | | A62C 37/50 |
| | | | | | 73/291 |
| 2014/0096603 | A1 * | 4/2014 | Nichols | | G01F 23/30 |
| | | | | | 73/305 |
| 2015/0040661 | A1 * | 2/2015 | Olson | | G01F 23/60 |
| | | | | | 73/313 |

OTHER PUBLICATIONS

English language translation of CN 201747701 U, which originally published on Feb. 2011.*

"LVDT Position Sensors Tutorial" Harold G. Schaevitz LLC, available on the internet at "https://web-beta.archive.org/web/20120709033625/http://thesensorconnection.com:80/content/lvdt-positionsensors-tutorial-harold-g-schaevitz-llc-spring-loaded-ac-lvdts-and-signal-cond", and accessed on Jul. 2012.*

* cited by examiner

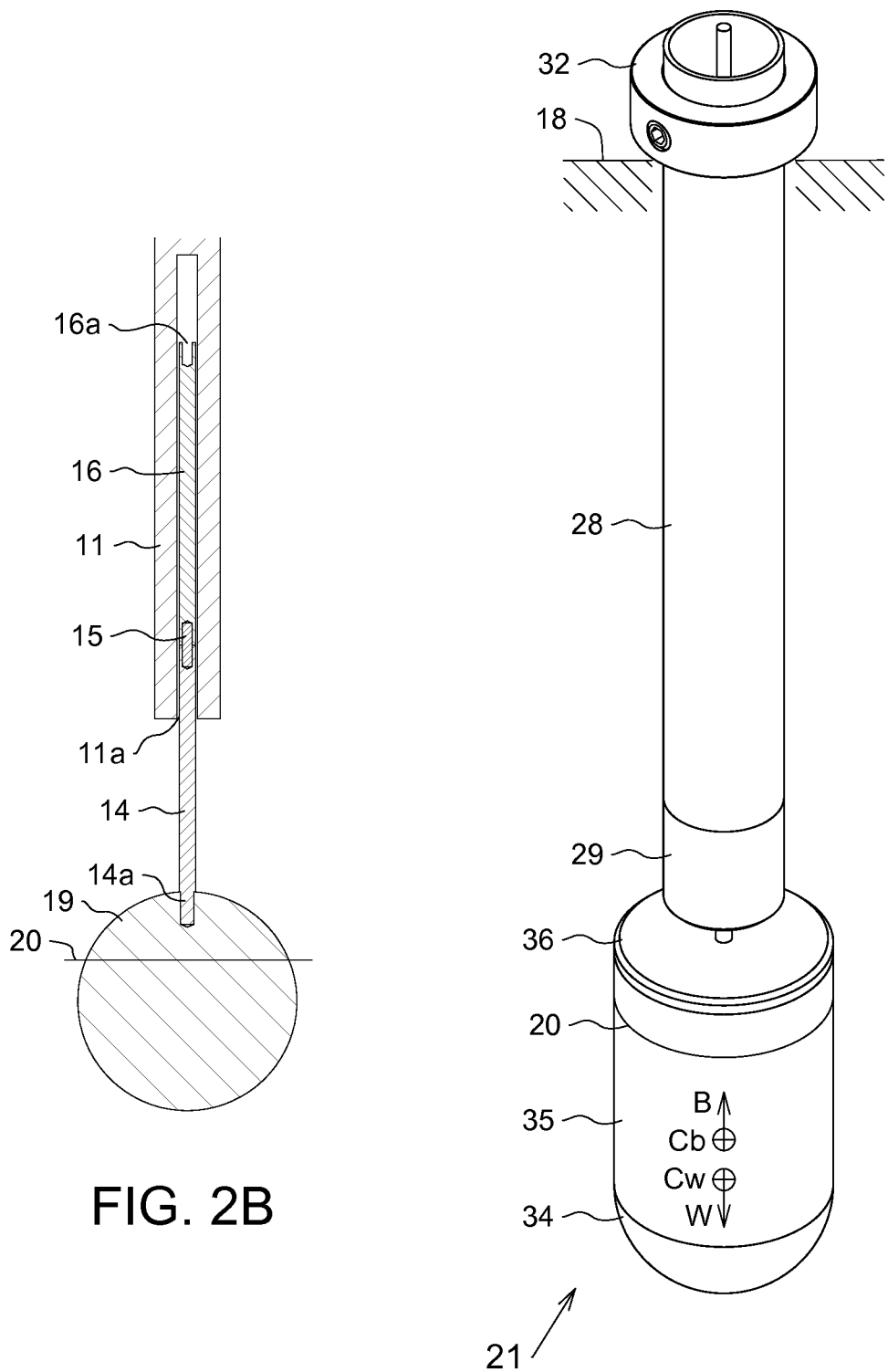

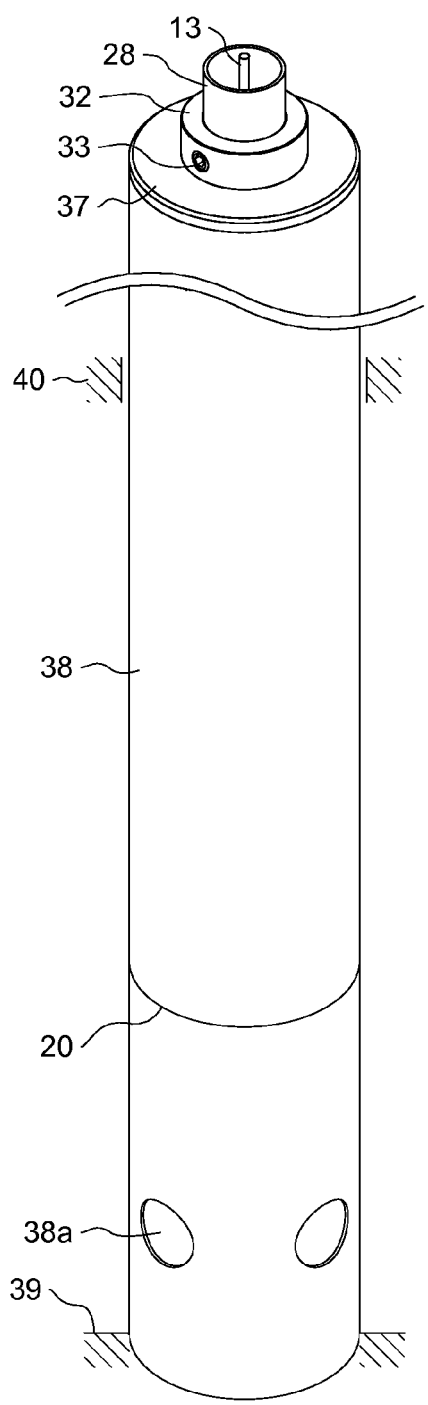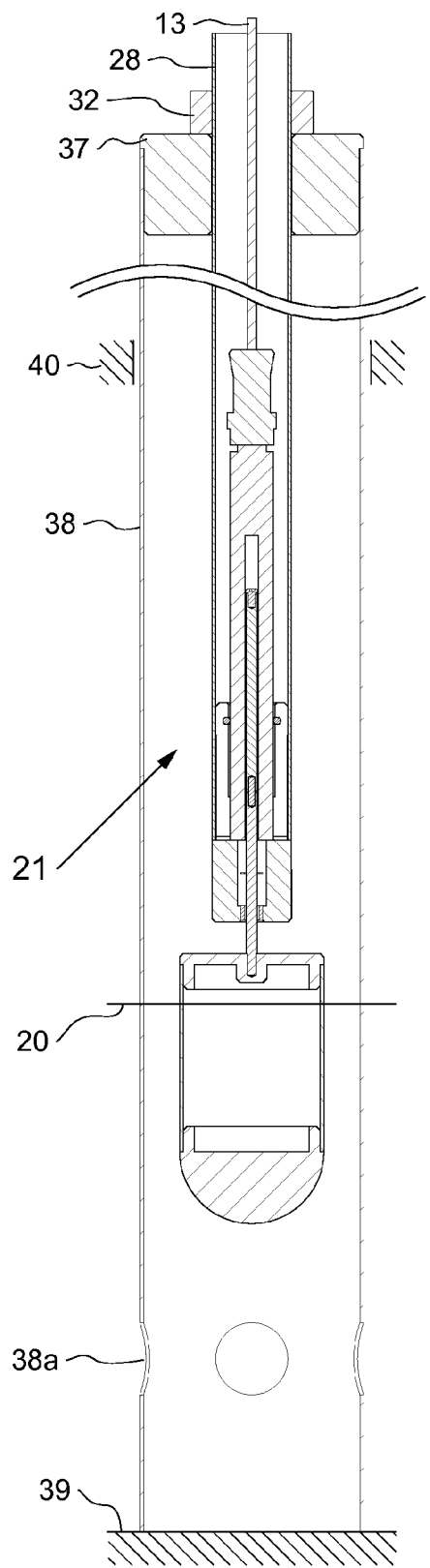
FIG. 6A
FIG. 6B

LEVEL MEASUREMENT SYSTEM

CROSS-REFERENCE TO RELATED APPLICATIONS

This application claims the priority benefit of U.S. Non-Provisional application Ser. No. 13/964,098 filed Aug. 11, 2013 and U.S. Provisional Application 61/742,414 filed Aug. 11, 2012, both of which are herein incorporated by reference in their entirety.

TECHNICAL FIELD

This disclosure is related to level measurement of containment structures. More particularly, the disclosure discusses embodiments configured to measure minute level changes that occur over short periods of time and in some embodiments to determine whether the minute level changes are due to fluid seepage through the containment structure.

BACKGROUND

The statements in this section merely provide background information related to the present disclosure. Accordingly, such statements are not intended to constitute an admission of prior art.

Fluid retention basins are required to hold liquid waste, sometimes for a limited time and sometimes indefinitely. The types of waste can include animal waste from farms, municipal wastewater, coal ash slurry, and the like. Many of the basins have clay liners (bottoms) or other impermeable liners such as plastic (e.g. high density polyethylene or polyvinylchloride). It is important to regularly test these liners to ensure that the fluid is not migrating through the clay at an acceptable rate, or in the case of an impermeable liner that there isn't a breach in the liner.

These liner tests are done using apparatuses and methods which gauge the surface level change of the basin over time and compare that with an estimated or measured level change that is due to evaporation or other environmental factors. To do the tests, the basin must be in a static condition. That is, no influent or effluent is allowed.

BRIEF SUMMARY OF THE INVENTION

In one embodiment, a level measurement system comprises: a core train; a float attached to a bottom of the core train; and an LVDT coil, wherein a portion of the core train is located coaxially within a bore of the LVDT coil.

In a separate embodiment, the system further comprises a guide shoe on the core train located within the LVDT coil and configured to minimize friction between the core train and the bore of the LVDT.

In a separate embodiment, the guide shoe has a rounded edge and is configured to reduce a contact angle between the core train and the bore of the LVDT.

In a separate embodiment, the system further comprises a coaxial housing that comprises an extension tube and a clamping shell, whereby the LVDT coil is secured coaxially within the extension tube by compression of the clamping shell between the extension tube and the LVDT coil.

In a separate embodiment, the clamping shell has a shoulder at a bottom with a hole in it that is larger than a diameter of the core train.

In a separate embodiment, the core train has a collar on it that is larger than the diameter of the hole in the shoulder of the clamping shell.

In a separate embodiment, a center of buoyancy of the core train and the float is above a center of gravity of the core train and the float.

In a separate embodiment, the system further comprises a vibrator within the float that is configured to reduce a fluid surface tension and a frictional resistance.

In a separate embodiment, the system further comprises a tube configured to rest upon a surface of a containment structure, wherein the core train, float, and LVDT coil are mounted inside the tube and configured to determine a fluid level.

In a separate embodiment, the system further comprises a tube configured to rest upon a bottom of a pan, wherein the core train, float, and LVDT coil are mounted inside the tube and configured to determine a fluid level of a reference fluid within the pan.

In one embodiment, a level measurement system comprises: a core train; a float attached to a bottom of the core train; an LVDT coil, wherein a portion of the core train is located coaxially within a bore of the LVDT coil; and a guide shoe on the core train located within the LVDT coil and configured to minimize friction between the core train and the bore of the LVDT.

In one embodiment, a level measurement system configured to measure a fluid level change of a fluid containment structure comprises: a first linear variable differential transformer (LVDT) comprising: a first tube configured to rest upon a bottom of the fluid containment structure; a first float within the tube, wherein the first float includes a first vibrator configured to reduce a fluid surface tension and frictional resistance; a first rod and first core both coaxially attached to a top of the first float; and a first LVDT transducer configured to measure a level of the first rod; a computing device configured to read and record the level of the first rod; and a housing.

In a separate embodiment, the level measurement system further comprises: a second LVDT device comprising: a pan; a second tube configured to rest upon a bottom of the pan; a second float configured to float within the pan, wherein the second float includes a second vibrator configured to reduce a fluid surface tension and frictional resistance; a second rod and second core both coaxially attached to a top of the second float; and a second LVDT transducer configured to measure a level of the second rod; further wherein the computing device is configured to read and record the level of the first rod and the level of the second rod; and further wherein the housing is configured to hold or connect elements of the first LVDT device and elements of the second LVDT device.

The tubes can have a cross-section that is cylindrical or the like. Preferably the tubes' material of construction has a low thermal coefficient of expansion.

The floats have a geometric center of mass that is below the fluid surface. This keeps the floats in an upright position. In addition, the float center of mass must be below the float center of buoyancy for the float to remain naturally in an upright position. In a separate embodiment, the floats further comprise an integrated vibrator configured to overcome static fluid forces and enable more accurate fluid measurement. The vibrator can also overcome static force due to solid build-up on the level measurement system. Typically, the vibrator operates for 0.7 seconds every 7 seconds (roughly 10% of the time). This lowers the battery requirement of the system. However, different timing configurations are possible to overcome static forces.

In a separate embodiment, there are two contact points between each respective rod and core. The core utilizes a low friction material at these contact points to minimize static friction.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 2B is a front section view of a core train coupled to a spherical float that is partially submerged into and floating in a body of fluid that also shows the bottom part of an LVDT coil.

FIG. 3A is an isometric view of a level measurement system.

FIG. 6A is an isometric view of level measurement system deployed in a containment structure to measure fluid level.

FIG. 6B is a front section view of level measurement system deployed in a containment structure to measure fluid level.

DETAILED DESCRIPTION

Figure 1A:
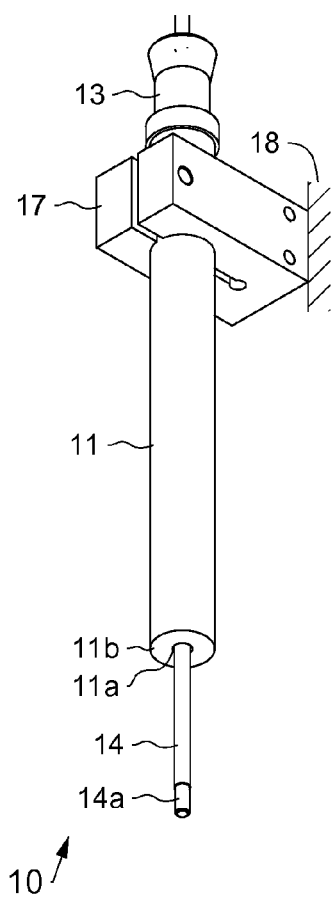
FIG. 1A is a lower-right isometric view of an LVDT.

The following detailed description of the invention is merely exemplary in nature and is not intended to limit the invention or the application and uses of the invention. Furthermore, there is no intention to be bound by any theory presented in the preceding background of the invention or the following detailed description of the invention.

As discussed in the background, testing to determine a leak rate through a fluid retention basin liner must occur under static conditions. This can be very problematic since many basins form part of a continuous process instead of a batch process. Furthermore, the current state of the art utilizes moderate accuracy measurements that take a substantial amount of time to produce. Hence, there exists a need for a highly accurate measurement apparatus and method that can be utilized within a short time period for fluid retention basin liner leak-rate testing.

The present disclosure discusses an apparatus and method to overcome the deficiencies in the current state of the art as described above. The system utilizes a linear variable differential transformer (LVDT) that provides a highly accurate level measurement. This highly accurate measurement enables a measurement of basin leak rate to be generated over a short period of time.

Due to the requirement for high accuracy over a short time frame, there are many unique and innovative features to the system. First, the LVDT minimizes internal static friction which is necessary to enable the buoyant forces to properly affect the LVDT. Also, carbon fiber material is used to minimize thermal expansion effects that could cause inaccuracies.

LVDT friction occurs at two contact points, the shoe and bearing collar. The static friction is minimized at these points using a low friction material.

The system also employs a self-righting float. The float's center-of-mass lies below the fluid surface. Also, float center of mass must is below the float center of buoyancy so that the float remains naturally in an upright position (the center of buoyancy of an object is the centroid of the displaced volume of fluid). This allows a rod that is attached to the float to move within the LVDT with a minimal amount of frictional resistance.

To overcome minimal static friction due to static forces at the described two contact points or frictional resistance due to solid build-up from the fluid, the system employs a vibrator located within the float. The vibrator runs on an intermittent cycle that requires it to vibrate only roughly 10% of the time, lowering the battery requirement for the system.

A linear variable differential transformer (LVDT) is a known electromechanical sensor that converts linear position of an object into a corresponding inductive reactance of an electric coil. The reactance can be measured to determine relative position and displacement (change of position) of the object. The object is mechanically coupled with a non-magnetic connecting rod to a magnetic core that travels axially within the coil, thereby changing reactance in a characteristic relationship with displacement of the core.

LVDTs have several features that are useful for instrumentation and measurement. Two features are especially relevant to the present invention.

Zero friction: No physical contact is necessary between the core and the coil. This allows for, but is not alone sufficient for, elimination of friction and resistance to axial travel of the core; thereby allowing for virtually infinite measurement sensitivity. Extremely sensitive measurement on the order of a millionth of an inch is possible; depending on the working range of the LVDT, resolution of the measurement electronics, and other factors.

Coaxial, cylindrical form: This provides for miniaturization of means to deploy the LVDT, for easier deployment in remote and tight spaces and harsh environments.

Referring to FIG. 1A through 1E, LVDT 10 includes coil 11, core train 12, and electrical signal plug (including cable) 13. The core train includes connecting rod 14 coupled with non-magnetic threaded stud 15 to core 16. The threaded stud screws into corresponding threaded holes 14b and 16b in the connecting rod and core respectively. The core train is free to travel axially within bore 11a. The core train is typically coupled with threaded end 14a to the object being measured.

For totally friction free operation, core train 12 must not contact the wall of bore 11a of coil 11 of LVDT 10. Any lateral force acting on the core train will cause it to contact the wall, resulting in friction and impaired measurement sensitivity. This is especially significant when the core train is coupled to a float to measure water level and is laterally restrained by the bore. In this patent specification "water" is a general term to mean water, liquid, or fluid of any kind.

Figure 2A:
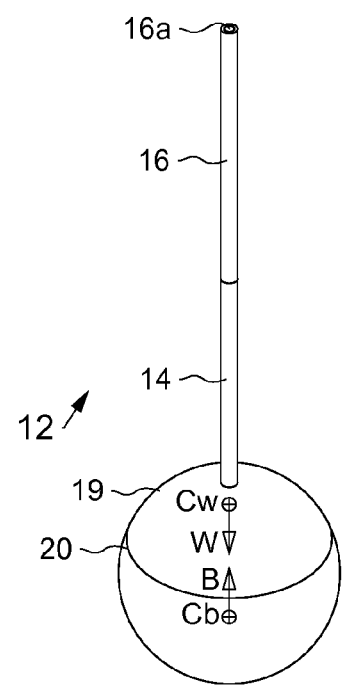
FIG. 2A is an isometric view of a core train coupled to a spherical float that is partially submerged into and floating in a body of fluid.

FIGS. 2A and 2B show the assembly of core train 12 coupled to known spherical float 19 that is partially submerged into and floating in free surface 20 of a body of water.

Referring to FIGS. 2A and 2B, weight W is the downward force of the assembly of core train 12 and float 19, acting at the resultant center of gravity Cw. Buoyant force B is the upward force acting at center of buoyancy Cb. The center of buoyancy is located at the geometric centroid of the part of the float that is submerged below free surface 20 of a body of water.

Referring still to FIGS. 2A and 2B, weight W equals buoyant force B and the assembly of core train 12 and float 19 is floating in the water. However, resultant center of gravity Cw is above center of buoyancy Cb. This is a metastable condition. Referring to FIG. 2A, without external lateral restraint the assembly cannot remain in the desired orientation shown and will immediately capsize.

Referring to FIG. 2B, the wall of bore 11a of coil 11 of LVDT 10 laterally restrains core train 12, bearing at the top of core 16, and bearing at the side of connecting rod 14. This keeps the assembly of the core train and float 19 in the desired orientation shown but also causes friction that impairs measurement sensitivity. This shortcoming in part inspires the inventive departures that are disclosed in this patent specification.

Figure 1B:
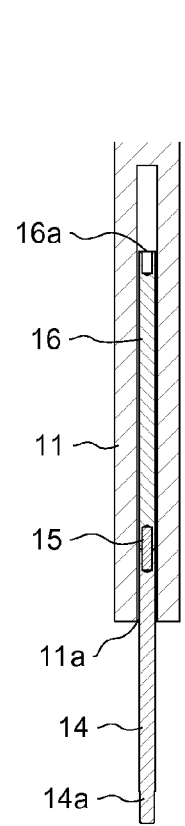
FIG. 1B is a front section view of the lower part of an LVDT.
Figure 1C:
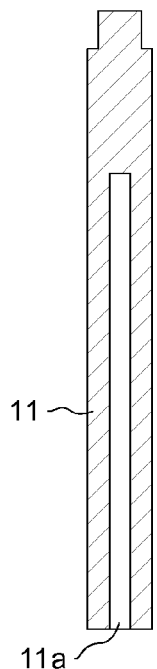
FIG. 1C is a front section view of a coil of an LVDT.
Figure 1D:
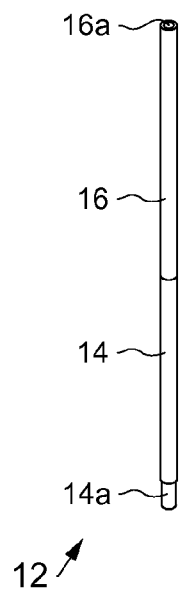
FIG. 1D is a right isometric view of a core train removed from a bore of a coil of an LVDT.
Figure 1E:
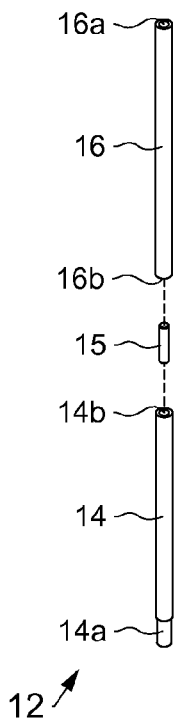
FIG. 1E is an isometric exploded view of a core train.

Referring to FIGS. 1A and 1B, core train 12 is shown to be "magically" floating within bore 11a of coil 11 of LVDT 10. However, without external vertical restraint it will immediately fall out of the bore. This is a defining characteristic of a free-core LVDT and presents difficulties when deploying the LVDT in remote and tight places.

An example is when LVDT 10 is coupled to a float to measure water level deep within a 3-inch diameter well. In this case there is no known means to keep the core train within the bore when the LVDT is lowered down the well to reach the water. This shortcoming in part also inspires the inventive departures that are disclosed in this patent specification.

Referring to FIG. 1A, known mounting block 17 clamps around coil 11 of LVDT 10. The mounting block is attached to fixed rigid structure 18 that provides a reference for measurement. The mounting block is asymmetrical with respect to the axis of LVDT 10. This configuration interferes with miniaturization of means to deploy the LVDT, for easy deployment in remote and tight places such as the aforementioned well. This shortcoming in part also inspires the inventive departures that are disclosed in this patent specification.

The present disclosure describes a level measurement system or "water level micrometer" that mitigates the aforementioned shortcomings and provides for practical deployment of a known free-core LVDT to measure water level; with unprecedented sensitivity, precision, and accuracy; over relatively long distances and wide temperature ranges. The level measurement system or "water level micrometer" is further described within the context of an application to measure fluid level in a retention basin and overcome the shortcomings discussed in the background and earlier in the detailed description.

Inventive departures are embodied within a novel core train, a novel coaxial housing, and a novel float. These departures individually and together eliminate friction within the LVDT, reduce thermal error, and also provide for practical deployment of the LVDT in remote and tight spaces and harsh environments.

FIGS. 3A through 3E, FIG. 4A through 4D, and FIG. 5 show an embodiment of the invention, water level micrometer 21, in the upright vertical orientation of use.

Figure 3B:
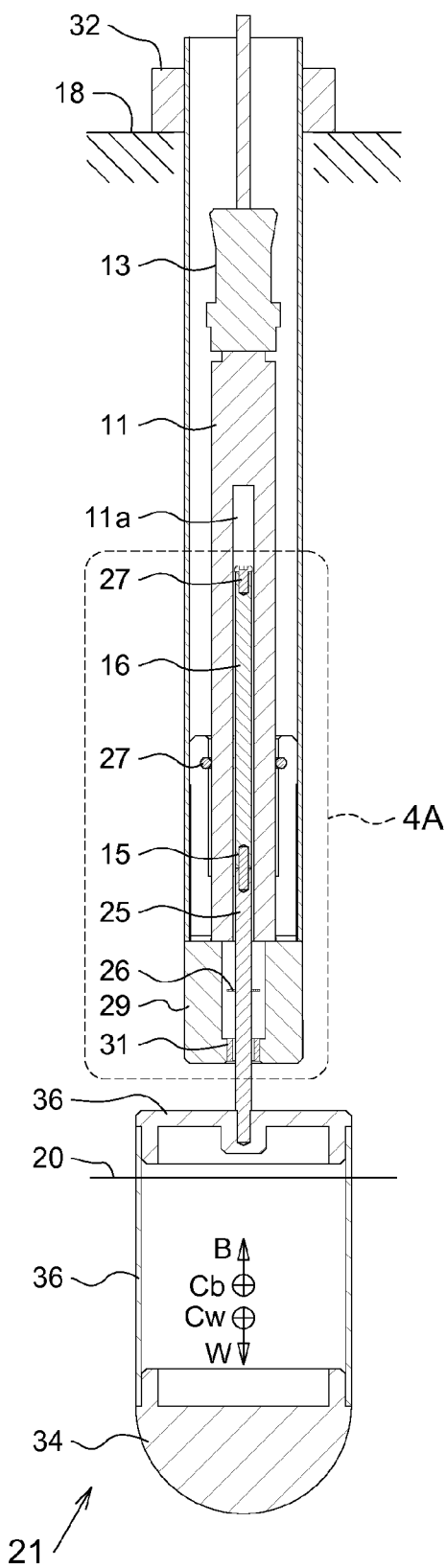
FIG. 3B is a front section view of a level measurement system.

Referring to FIGS. 3A and 3B, water level micrometer 21 is deployed from a fixed rigid structure and into free surface 20 of a body of water to measure water level.

Figure 3C:
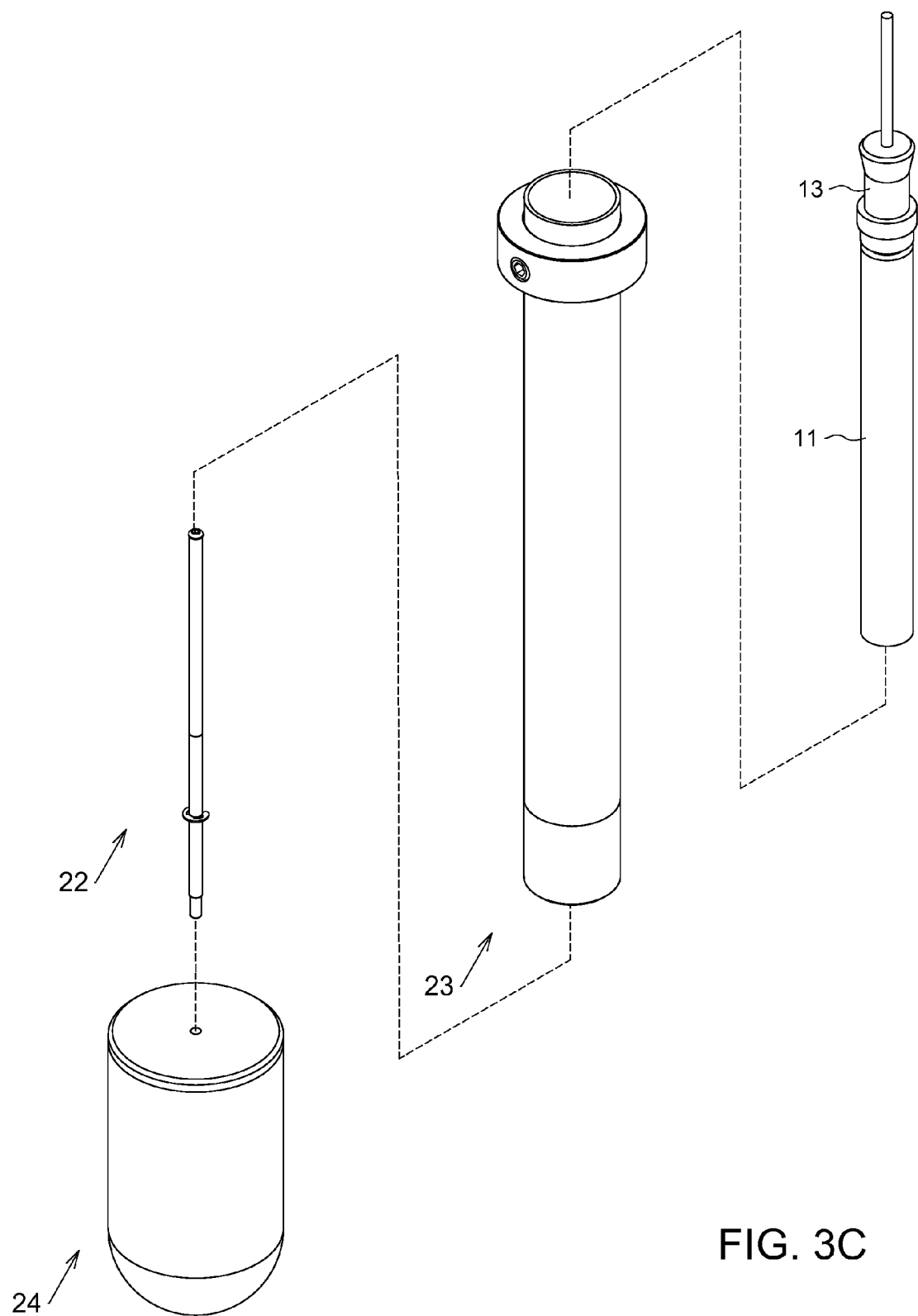
FIG. 3C is an isometric exploded view showing major assemblies of a level measurement system.

Referring to FIG. 3C, water level micrometer 21 consists of core train 22, coaxial housing 23, float 24, and the assembly of known LVDT coil 11 and electrical signal plug 13. FIG. 3C and the identification of major assemblies therein shall apply globally to the following text of this patent specification.

Figure 3D:
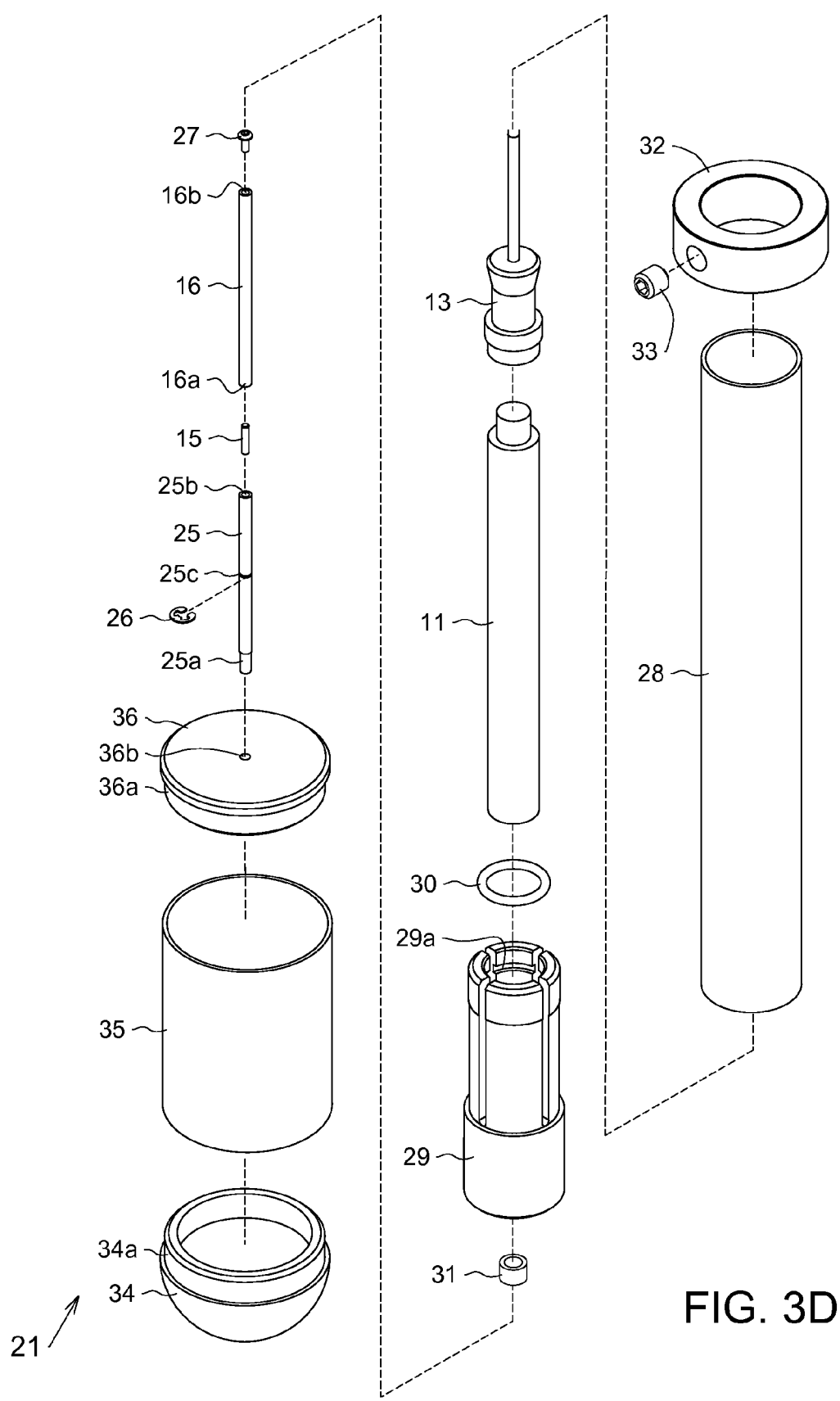
FIG. 3D is an isometric exploded view showing individual components of a level measurement system.
Figure 3E:
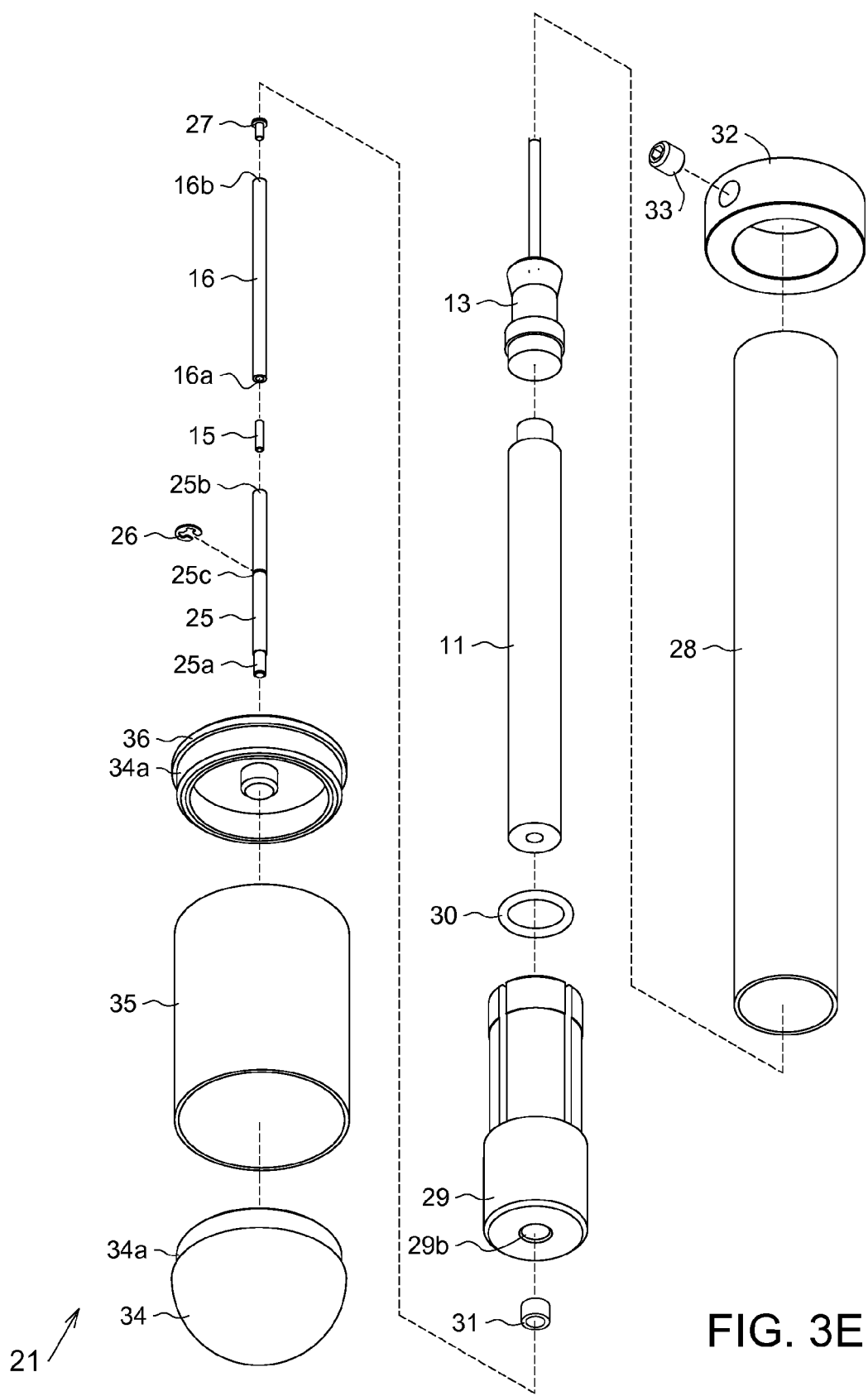
FIG. 3E is a lower-right isometric exploded view showing individual components of a level measurement system.

Referring to FIGS. 3D and 3E, core train 22 includes connecting rod 25 with groove 25c, known threaded stud 15, known core 16, guide shoe 27, and e-ring 26. The connecting rod 25 is coupled with the threaded stud 15 to the core 16. The threaded stud 15 screws into corresponding threaded holes 25b and 16b in the connecting rod 25 and core 16 respectively. The guide shoe 27 screws into threaded hole 16a of the core 16. The e-ring 26 snaps into the corresponding groove 25c in the connecting rod 25.

Figure 4A:
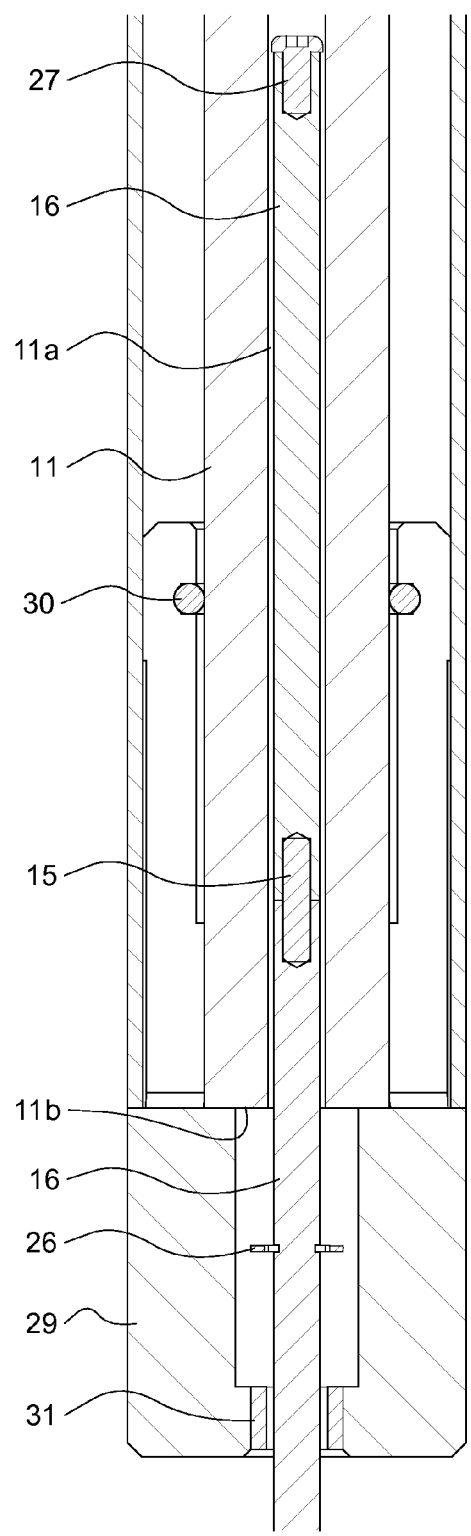
FIG. 4A is a front section view of part of a level measurement system, magnified.
Figure 4B:
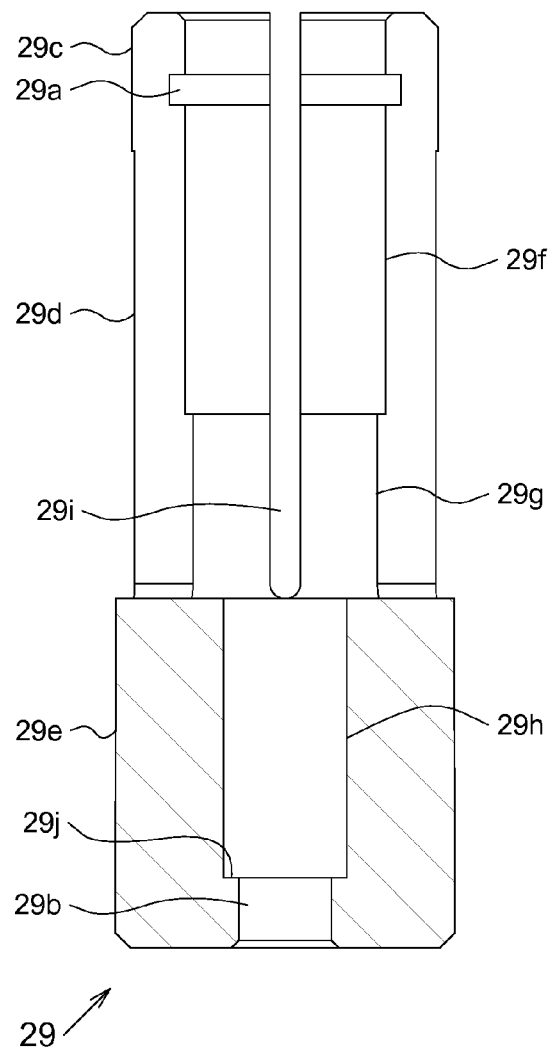
FIG. 4B is a front section view of a clamping shell of a coaxial housing, magnified.
Figure 4C:
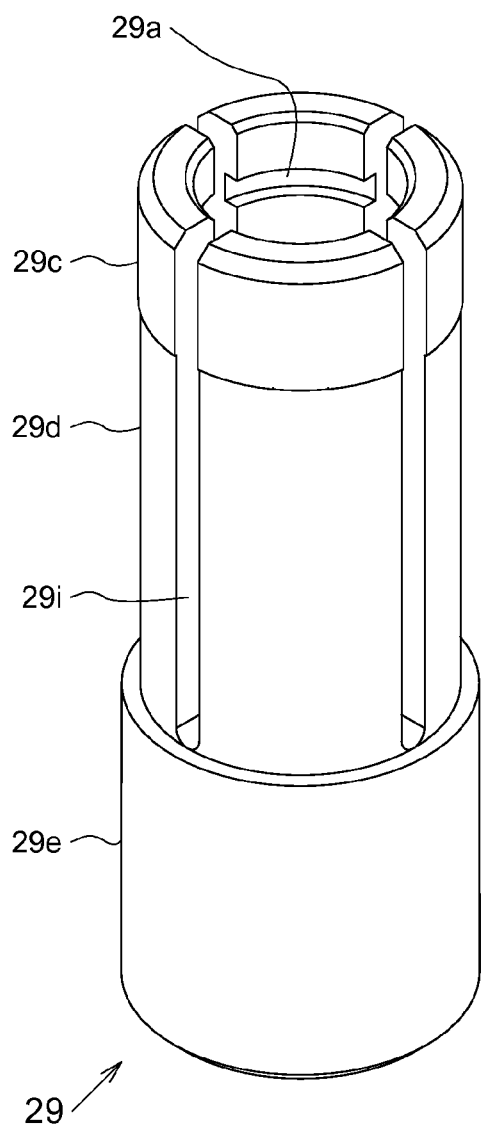
FIG. 4C is a right isometric view of a clamping shell of a coaxial housing, magnified.
Figure 4D:
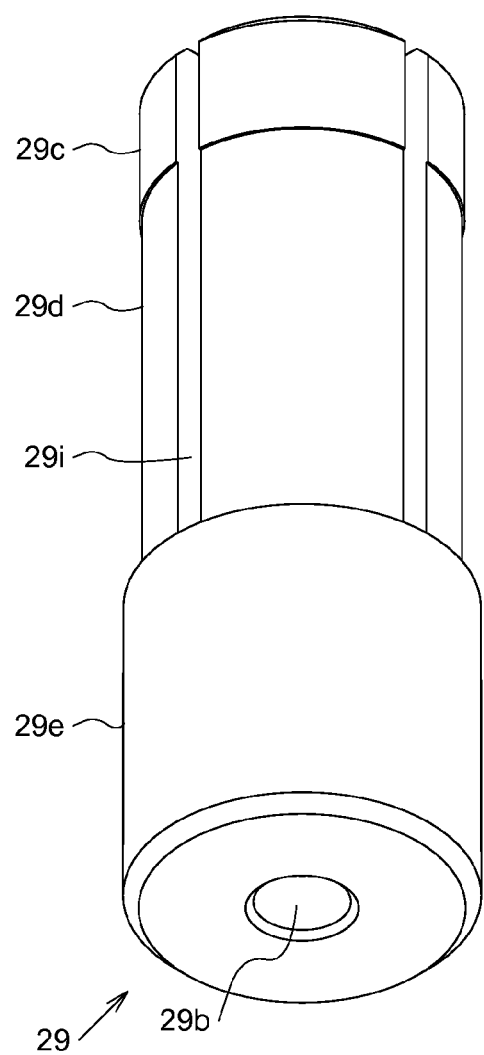
FIG. 4D is a lower-right isometric view of a clamping shell of a coaxial housing, magnified.
Figure 5:
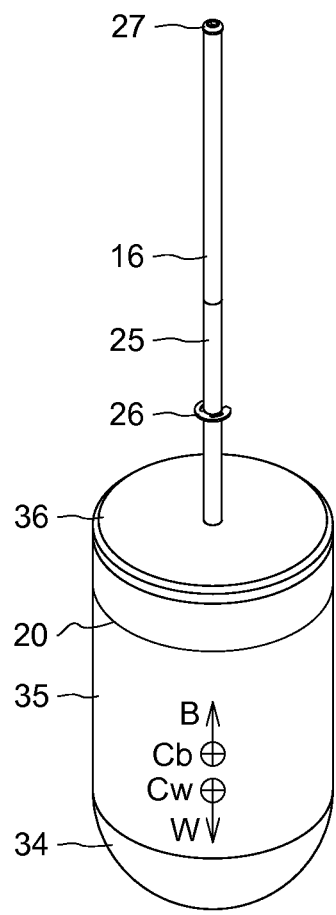
FIG. 5 is an isometric view of the assembly of a float and a core train.

Referring FIGS. 3B and 4A, guide shoe 27 of core train 22 reduces friction between core 16 and bore 11a of coil 11, thereby increasing measurement sensitivity. The guide shoe 27 is a common pan-head screw made out of low-friction material such as nylon or PTFE plastic. The diameter of the head is slightly smaller than the diameter the bore, and slightly larger than the diameter of the core. The guide shoe reduces friction as follows: it has a lower coefficient of friction than the core that is typically made out of stainless steel, it has a rounded edge that reduces the contact angle with the bore, and it reduces effective clearance of core train 22 within the bore and thereby reduces the possible angular departure of the core train from vertical. This reduces the contact angle of connecting rod 25 within the bore 11a.

Referring still to FIGS. 3B and 4A, e-ring 26 of core train 22 together with clamping shell 29 of coaxial housing 23 prevents the core train from falling out of the coaxial housing, thereby providing for practical deployment in remote and tight spaces. The e-ring is a common e-style retaining of stainless steel. Together with the clamping shell, it retains the core train within the coaxial housing yet allows the core train to travel axially within bore 11a of coil 11.

Although e-ring 26 and groove 25c of connecting rod 25 of core train 22 are preferred, other embodiments are possible. Substitutes include a common slotted spring pin of appropriate dimensions inserted through a corresponding hole in connecting rod 25, or any suitable collar of appropriate dimensions on the connecting rod.

Referring to FIGS. 3B, 3D, 3E, 4A, and 5, connecting rod 25 of core train 22 is machined out of common aluminum rod or tube. Other materials such as stainless steel, carbon fiber tube, and brass are possible; with the following considerations: it must be virtually non-magnetic to prevent interference with the characteristic relationship of displacement of core 16 to reactance of coil 11, needs a relatively low coefficient of friction as affects resistance to axial travel within bore 11a of coil 11, needs thermal stability (coefficient of thermal expansion) of the material as affects measurement accuracy with respect to temperature, and weight as affects the size of float 24 necessary to buoy core train 22.

Referring to FIGS. 3D and 3E, coaxial housing 23 includes extension tube 28, clamping shell 29, o-ring 30, bushing 31, ring clamp 32, and set screw 33. The extension tube slides with a compression fit over the clamping shell. The o-ring is inserted into corresponding groove 29a around the inside circumference of the clamping shell. The bushing is pushed with a compression fit into corresponding hole 29d of the clamping shell.

Referring to FIGS. 3B and 4A, extension tube 28 of coaxial housing 23 spans the distance between fixed rigid structure 18 and coil 11 that is positioned just above free surface 20 of the body of water. This distance may be relatively large, on the order of many feet. The extension tube is made out of thin-wall carbon fiber tube (CFT). Although other materials are possible, CFT is thermally stable, with a uniquely low coefficient of thermal expansion. The extension tube thereby provides for measurement accuracy, especially over long distances between the fixed rigid structure and free surface, and over wide ambient temperature ranges.

Extension tube 28, together with clamping shell 29 and o-ring 30 provide for mounting coil 11 by compression of the o-ring around the circumference of the coil, coaxially within the extension tube. This provides for mounting the coil by a discrete band around its circumference, preferably at the null point of the coil, with contact area less than a known mounting block. The discrete contact band minimizes thermal error and provides for measurement accuracy, especially over wide temperature ranges.

Referring to FIGS. 3B, and 4A through 4C, clamping shell 29 is a hollow cylindrical shell machined out of rigid PVC plastic. Other embodiments are possible including any suitable machined, molded, or 3D-printed rigid or semi-rigid material.

Clamping shell 29 fits by compression within extension tube 28 and around o-ring 30 and core 11. Key characteristics of the shell are longitudinal flutes, and a series of specific diameters. These characteristics, along with characteristics of the related o-ring, e-ring 26 of core train 22, and bushing 31 are described as follows:

Longitudinal flutes 29i allow for slight radial expansion of the top part of clamping shell 29, for insertion of o-ring 30 into groove 29a, and for insertion of coil 11 through the o-ring and into the clamping shell. The longitudinal flutes also allow for compression of the shell; for inserting the assembly of the shell, o-ring, and coil into extension tube 28. Although the longitudinal flutes are preferred they may not be necessary if the shell is made out of semi-rigid material, such as a suitable semi-rigid polyurethane, that allows for slight radial expansion and compression.

The diameter of surface 29c matches the inside diameter of extension tube 28. To minimize thermal error, the axial or vertical length of this surface should be as small as necessary to securely clamp the assembly of clamping shell 29, o-ring 30 and coil 11 within extension tube 28.

The diameter of grove 29a matches the outside diameter of o-ring 30.

The inside diameter of o-ring 30 is slightly less than the diameter of coil 11.

O-ring 30 is a common o-ring made out of any suitable compressible material such as nitrile rubber. Although it is preferred, it is not necessary if the clamping shell 29 is made out of semi-rigid, compressible material such as a suitable polyurethane. In this case a profile similar to the profile of the o-ring would be integral with the monolith of the clamping shell.

The diameter of surface 29d is slightly less than the inside diameter of extension tube 28. This surface centralizes clamping shell 29 within the extension tube but without tight contact, to minimize thermal error.

The diameter of surface 29e matches the outside diameter of extension tube 28, although this is not critical to the functioning of the invention.

The diameter of surface 29f is slightly larger than the diameter of coil 11.

The diameter of surface 29g equals, or is slightly larger than, the diameter of coil 11 but slightly smaller than the diameter of surface 29f. This surface centralizes the coil within clamping shell 29 but without tight contact, to minimize thermal error.

The diameter of surface 29h is slightly larger than the diameter of e-ring 26 to allow free axial travel of core train 22. The axial or vertical length of this surface is chosen to correspond to the operating range of the assembly of core 16 and coil 11.

Together with e-ring 26 of core train 22; surface 11b of coil 11 sets the upper limit, and surface 29j of clamping shell 29 sets the lower limit; of the range of travel of core train 22.

The diameter of hole 29b is slightly smaller than the diameter of e-ring 26, to retain core train 22 within coaxial housing 23.

The diameter of surface (or hole) 29b is also slightly less than the outside diameter of bushing 31, to provide for a tight, compression fit of the bushing within the hole.

The inside diameter of bushing 31 is slightly larger than the diameter of connecting rod 25, to allow for free axial travel of core train 22 yet restrain it laterally to minimize angular departure from vertical of core train 22.

Bushing 30 reduces friction on connecting rod 25 and thereby provides for measurement sensitivity. It is made out of any suitable low-friction material such as nylon or PTFE. Although the bushing is preferred it is not necessary if clamping shell 29 is made out of similar low friction material. In this case the diameter of hole 29b is chosen to be slightly larger than the diameter of connecting rod 25.

Referring to FIGS. 3A, 3B, 3D, 3E, and 5, FLOAT 24 consists of ballast 34 bonded and sealed to tube 35 that is bonded and sealed to cap 36. The float is engineered to buoy core train 22 in a naturally vertical position. Specifically, the resultant center of buoyancy Cb is above resultant center of gravity, of the float and core train assembly. This substantially reduces contact of core train 22 with bore 11a of coil 11, essentially eliminating friction and providing for virtually infinite measurement sensitivity. The float is optimized to achieve the aforementioned buoyancy with the smallest possible diameter and length, as necessary for practical deployment in tight and remote spaces.

Ballast 34 is machined out of aluminum. The outside diameter of surface 34a is slightly smaller than the inside diameter of tube 35. The tube is thin-wall carbon fiber tube. Cap 36 is machined out of rigid PVC plastic. The outside diameter of surface 36a of the cap is slightly smaller that inside diameter of the tube. A threaded, blind hole 36b at the top center of the cap corresponds to threaded end 25a of connecting rod 25 of core train 22. The ballast, tube, and cap are bonded and sealed together with marine epoxy.

While the aforementioned embodiment of float 24 is preferred it does not limit the invention. Any other float of any kind may be suitable so long as it can buoy core train 22 in a naturally vertically position.

Referring to FIGS. 6A and 6B, shown is water level micrometer 21 deployed in a containment structure to measure water level 20. The micrometer is hanging by ring clamp 32 from collar 37 within support tube 38 that is resting on floor of containment structure 39.

Ring clamp 32 rests on the top of collar 37.

Collar 37 is machined out of rigid PVC plastic. The outside diameter of the collar is slightly smaller than the inside diameter of support tube 38. The inside diameter of the collar is slightly larger than the outside diameter of extension tube 28. A lip on the collar rests on the top edge of the support tube.

Support tube 38 is any length as necessary to practically deploy water level micrometer 21 in the containment structure. The support tube can be any diameter so long as it does not interfere with operation of the float.

Support tube 38 is made out of thin-wall CFT. Although other materials are possible, CFT is thermally stable, with a uniquely low coefficient of thermal expansion.

Equalizer holes 38a in the wall of the support tube 38 serve to hydraulically connect water inside of the support tube, to water outside of the support tube.

Support tube 38 rests on the floor of the containment structure 39. In this case the floor of the containment structure serves the same function as the previously described fixed rigid structure 18 of FIGS. 3A and 3B, to provide a reference for measurement.

Lateral restraint 40 is any suitable restraint as necessary to hold support tube 38 in a substantially vertical orientation, yet impart no axial force on the support tube; to ensure proper functioning of water level micrometer 21.

Figure 7:
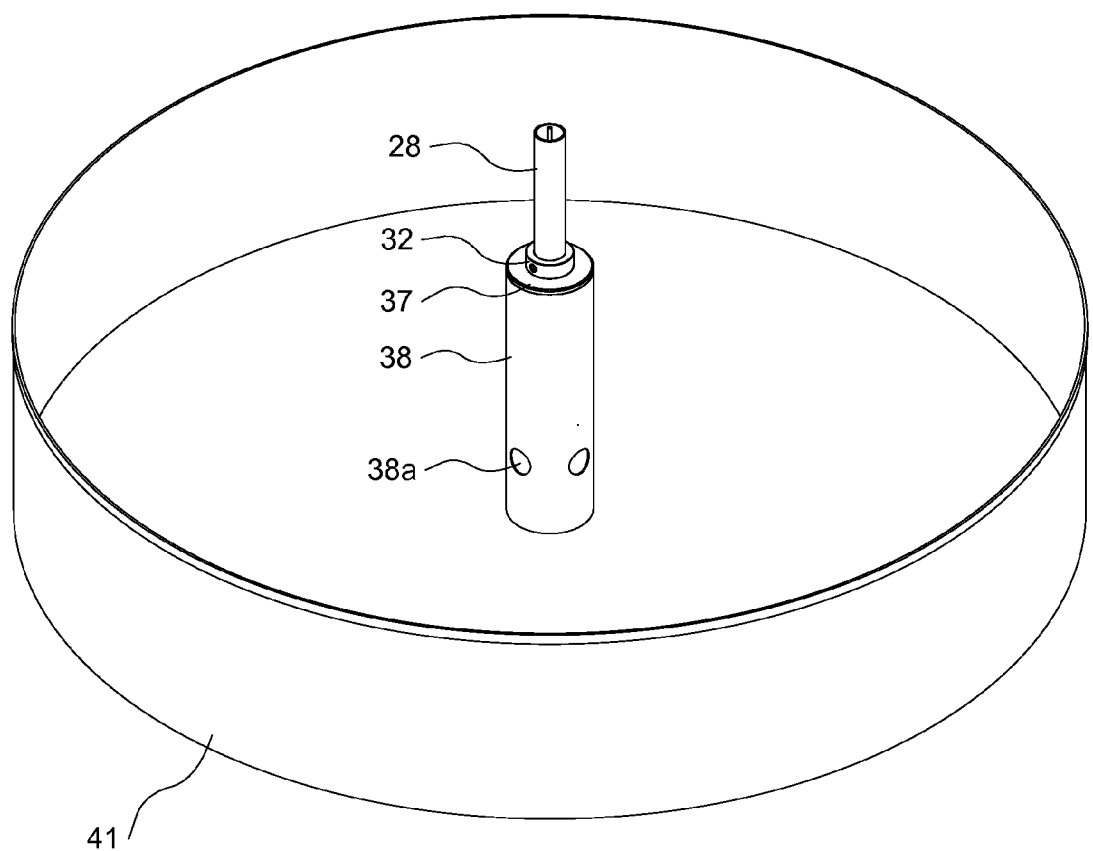
FIG. 7 is an isometric view of level measurement system deployed in an evaporation pan to measure fluid level.

Referring to FIG. 7, shown is water level micrometer 21 deployed in an evaporation pan 41, such as a National Weather Service Type A evaporation pan or a Colorado evaporation pan, to measure water level. The micrometer is hanging by ring clamp 32 from collar 37 within support tube 38 that is resting on the floor of evaporation pan 41.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

I claim:

1. A level measurement system comprising:
   a core train;
   a float attached to a bottom of the core train;
   an LVDT coil, wherein a portion of the core train is located coaxially within a bore of the LVDT coil; and
   a coaxial housing that comprises an extension tube and a clamping shell, whereby the LVDT coil is secured coaxially within the extension tube by compression of the clamping shell between the extension tube and the LVDT coil.

2. The level measurement system of claim 1, the system further comprising a guide shoe on the core train located within the LVDT coil and configured to minimize friction between the core train and the bore of the LVDT.

3. The level measurement system of claim 2, wherein the guide shoe has a rounded edge and is configured to reduce a contact angle between the core train and the bore of the LVDT.

4. The level measurement system of claim 1, wherein the clamping shell has a shoulder at a bottom with a hole in it that is larger than a diameter of the core train.

5. The level measurement system of claim 4, wherein the core train has a collar on it that is larger than the diameter of the hole in the shoulder of the clamping shell.

6. The level measurement system of claim 1, wherein a center of buoyancy of the core train and the float is above a center of gravity of the core train and the float.

7. The level measurement system of claim 1, the system further comprising a vibrator within the float that is configured to reduce a fluid surface tension and a frictional resistance.

8. The level measurement system of claim 1, the system further comprising a tube configured to rest upon a surface of a containment structure, wherein the core train, float, and LVDT coil are mounted inside the tube and configured to determine a fluid level.

9. The level measurement system of claim 1, the system further comprising a tube configured to rest upon a bottom of a pan, wherein the core train, float, and LVDT coil are mounted inside the tube and configured to determine a fluid level of a reference fluid within the pan.

10. A level measurement system comprising:
    a core train;
    a float attached to a bottom of the core train;
    an LVDT coil, wherein a portion of the core train is located coaxially within a bore of the LVDT coil; and
    a vibrator within the float that is configured to reduce a fluid surface tension and a frictional resistance.

11. The level measurement system of claim 10, the system further comprising a guide shoe on the core train located within the LVDT coil and configured to minimize friction between the core train and the bore of the LVDT.

12. The level measurement system of claim 11, wherein the guide shoe has a rounded edge and is configured to reduce a contact angle between the core train and the bore of the LVDT.

13. The level measurement system of claim 10, wherein the clamping shell has a shoulder at a bottom with a hole in it that is larger than a diameter of the core train.

14. The level measurement system of claim 13, wherein the core train has a collar on it that is larger than the diameter of the hole in the shoulder of the clamping shell.

15. The level measurement system of claim 10, wherein a center of buoyancy of the core train and the float is above a center of gravity of the core train and the float.

16. The level measurement system of claim 10, the system further comprising a tube configured to rest upon a surface of a containment structure, wherein the core train, float, and LVDT coil are mounted inside the tube and configured to determine a fluid level.

17. The level measurement system of claim 10, the system further comprising a tube configured to rest upon a bottom of a pan, wherein the core train, float, and LVDT coil are mounted inside the tube and configured to determine a fluid level of a reference fluid within the pan.

* * * * *